United States Patent [19]
Köhler et al.

[11] Patent Number: 4,563,220
[45] Date of Patent: * Jan. 7, 1986

[54] PRODUCTION OF BISMUTH OXIDE/CHROMIUM OXIDE MIXED PHASE PIGMENTS

[75] Inventors: Peter Köhler; Heinrich Heine, both of Krefeld, Fed. Rep. of Germany

[73] Assignee: Bayer Aktiengesellschaft, Leverkusen, Fed. Rep. of Germany

[*] Notice: The portion of the term of this patent subsequent to Jul. 16, 2002 has been disclaimed.

[21] Appl. No.: 509,252

[22] Filed: Jun. 29, 1983

[30] Foreign Application Priority Data

Jul. 17, 1982 [DE] Fed. Rep. of Germany ....... 3226892

[51] Int. Cl.$^4$ ............................................. C04B 31/00
[52] U.S. Cl. .................. 106/288 B; 106/302
[58] Field of Search ............................ 106/302, 288 B

[56] References Cited

U.S. PATENT DOCUMENTS

| 2,313,619 | 3/1945 | Bruce | 106/302 |
| 2,369,261 | 2/1945 | Slonim | 106/302 |
| 3,072,495 | 1/1963 | Pitrot | 106/302 |
| 3,864,140 | 2/1975 | Ferrigno | 106/288 B |

FOREIGN PATENT DOCUMENTS 1592388 12/1970 Fed. Rep. of Germany.
2135184 1/1972 Fed. Rep. of Germany.
2517713 4/1976 Fed. Rep. of Germany.

OTHER PUBLICATIONS

"Syntheses and Properties of Phases in the Bismuth Trioxide-Chromium Trioxide System"; vol. 98, 1983 Chem. Abstracts.
Chemical Abstracts, vol. 72, No. 14, Apr. 6, 1970, p. 411, No. 71837a, Colombus, Ohio, K. Masuno: "Crystal Studies of the $Bi_2O_3$-$Cr_2O_3$ System" & Nippon Kagaku Zasshi 1969, 90 (11) 1122–1127.
Chemical Abstracts, vol. 88, No. 24, Jun. 12, 1978, p. 490, No. 177845x, Colombus, Ohio, Masonari Inada: "Crystal Phases of Nonohmic Zinc Oxide Ceramics" & JPN. J. Appl. Phys. 1978, 17 (1), 1–10.

Primary Examiner—John Kight
Assistant Examiner—Garnette D. Draper
Attorney, Agent, or Firm—Sprung Horn Kramer & Woods

[57] ABSTRACT

A bismuth oxide/chromium oxide mixed phase pigment having the composition $Bi_{2-x}Cr_xO_3$ wherein $0.05 \times 0.5$ and a specification surface of about 1.0 to 10 m$^2$/g is produced by mixing metallic bismuth intensively with a chromium (III) and/or chromium (VI) compound, calcining the homogeneous mixture in an oxidizing atmosphere at a temperature of about 500° to 800° C., and crushing the product to pigment size.

9 Claims, No Drawings

PRODUCTION OF BISMUTH OXIDE/CHROMIUM OXIDE MIXED PHASE PIGMENTS

This invention relates to a process for the production of bismuth oxide/chromium oxide mixed phase pigments which range in color from yellow-orange to orange-red and have the composition $(Bi_{2-x}Cr_x)O_3$ wherein x represents values from 0.05 to 0.5, and to the use thereof.

Pure bismuth trioxide ($Bi_2O_3$) exists in four different modifications. Only the α-phase is stable at room temperature. In a temperature range of from 717 to 825° C. δ-$Bi_2O_3$ is obtained as a high temperature phase, while β- and γ-$Bi_2O_3$ is metastable (Gmelins Handbuch der anorganischen Chemie, volume 19, P. 629 (1964), 8th edition). The tetragonal β- and the cubic γ-phase may be stabilized at room temperature after cooling by adding metal oxides, such as $Sb_2O_3$, $Al_2O_3$, $Ga_2O_3$, $In_2O_3$, $Y_2O_3$, $Fe_2O_3$, $Cr_2O_3$, $ZrO_2$, $SiO_2$ or $GeO_2$ to the $Bi_2O_3$ melt (G. Gattow, H. Schröder; Z. anorg.allg. Chem. 318 (1962), P. 176).

DE-OS No. 1,592,388 describes the mixed phase formation of $Bi_2O_3$ with a plurality of mono- to hexavalent metal oxides by calcining homogeneous mixtures of corresponding components, the various modifications of $Bi_2O_3$ being obtained according to the chemical composition. By incorporating $Cr_2O_3$ only products of a tomato-red color are obtained according to this process which products do not possess the necessary particle sizes for them to be used as pigments.

An object of the present invention is to provide a process which allows the production of bismuth oxide/chromium oxide mixed phase pigments having the composition $Bi_{2-x}Cr_xO_3$ ($0.05 \leq x \leq 0.5$) and having specific surfaces of from 1.0 to 10 $m^2/g$ according to a simple and economical process, and which does not have the disadvantages of the prior art.

Surprisingly, it has now been found that this object is achieved by a process for the production of bismuth oxide/chromium oxide mixed phase pigments ranging in color from yellow-orange to orange-red, which is characterized in that metallic bismuth is intensively mixed with chromium(III) compounds and/or chromium(VI) compounds, the homogeneous mixture is calcined in an oxidizing atmosphere at a temperature of from 500° to 800° C., and the product is then crushed to pigment size.

The metallic bismuth should advantageously be in a finely-divided form, which may be achieved by mechanical crushing (for example in crushers) and by intensive grinding in dry or wet mills.

$Cr_2O_3$ (BET surfaces > 2.5 $m^2/g$), $CrO_3$, CrOOH (BET surfaces > 5 $m^2/g$), Cr-(III)-acetate (BET surfaces > 5 $m^2/g$) and Cr-(III)-hydroxides (BET surfaces > 10 $m^2/g$) may be used as chromium sources.

The finely-powered bismuth metal may be mixed with the chromium component in a dry condition or in a wet condition. Wet mixing of the components in ball, mortar or sand mills is particularly advantageous.

The homogeneous paste is dried to a residual moisture of less than 2% by weight in conventional drying units, such as drying chambers, belt driers or drum driers, and is crushed into a uniform powder (for example in a ball mill, pendulum mill, or mortar mill).

However, it is also possible to directly use the moist raw material mixture for calcining.

The raw material mixture should preferably be calcined with circulation of the product in a rotary tubular or rotary drum kiln with direct or indirect heating in an oxidizing atmosphere. The oxidizing atmosphere is produced by atmospheric oxygen or by gassing with air-/oxygen mixtures. The reaction of the raw material mixture can also be carried out in a fluidized bed.

A temperature ranging from 500° to 800° C. and calcining times of from 1 to 16 hours, preferably from 6 to 10 hours, are sufficient for the production of pure-phase (Bi, Cr)$_2O_3$ mixed phases (β-$Bi_2O_3$ structure). Slow high heating of the raw material mixture from room temperature up to the final temperature is advantageous compared to direct calcining at a temperature of from 500° to 800° C. with respect to the color purity of the resulting mixed phases.

After calcination, dry pre-crushing of the products (for example in mortar mills) and wet grinding in sand mills are carried out. The products are then filtered, washed, dried at 105° C. and de-agglomerated.

It is a surprising feature that metallic bismuth according to the process of the present invention may be converted in only one calcining stage, at a temperature of from 500° to 800° C. into pure-phase orange-red to yellow-orange (Bi, Cr)$_2O_3$ mixed phases.

The color tone of the (Bi, Cr)$_2O_3$ mixed phases depends, on the one hand, on the composition of the mixed phases ($Bi_{2-x}Cr_xO_3$ wherein $0.05 \leq x \leq 0.5$), and on the particle size of the end products on the other hand. The particle size of these pigments may be controlled by the level of the calcination temperature preferably (550°–800° C. and more) and by preferably 650°–750° C. the intensity of the wet grinding operation.

The pigments produced according to the present invention have specific surfaces of from 1 to 10 $m^2/g$ (determined in accordance with the BET method according to DIN 661 131), and have the structure of the β-phase of $Bi_2O_3$, based on X-Ray photography.

The bismuth oxide/chromium oxide mixed phase pigments ranging in color from orange-red to yellow-orange and having specific surfaces of preferably from 1.5 to 8 $m^2/g$ are suitable for pigmenting lacquers, plastics and dispersion dyes.

The present invention will now be illustrated by the following examples.

EXAMPLE 1

177.65 g of finely powdered metallic bismuth (99.99%, <40 μm) and 11.52 g of $Cr_2O_3$ (99.0%) were processed with 45 ml of water into a homogeneous paste in a mortar at room temperature, dried at 105° C. and then pulverized.

¼ each of this raw material mixture was calcined in a rotary tubular kiln for 2 and 8 hours respectively, and the other half was calcined for 16 hours at 750° C. with air/oxygen gassing (20 l/h; 1 part air, 1 part oxygen), and the mixtures were heated from room temperature to 750° C. over a period of 6 hours.

The calcination products were wet-ground in a stirrer-equipped ball mill, filtered, washed and dried at 105° C. in a drying chamber. Based on chemical analysis, the products contain 94.5±0.2% by weight of $Bi_2O_3$ and 5.4±0.1% by weight of $Cr_2O_3$, which corresponds to a composition of $Bi_{1.7}Cr_{0.3}O_3$. A characterization of the mixed phase pigments is provided in Table 1.

TABLE 1

| Calcination | Grinding | Specific surface m²/g | Visual color assessment |
|---|---|---|---|
| 2 h, 750° C. | 5 min at 500 rpm | 1.3 | orange-red |
| 8 h, 750° C. | 5 min at 500 rpm | 1.3 | |
| 16 h, 750° C. | 5 min at 500 rpm | 1.4 | |
| | 10 min at 1000 rpm | 2.7 | orange |

EXAMPLE 2

88.82 g of finely powdered metallic bismuth (99.99%; <40 μm) and 7.58 g of $CrO_3$ (99%) were processed into a paste with 20 ml of water according to Example 1, and further processed.

Half each of this raw material mixture was reacted in a rotary tubular kiln for 2 and 16 hours respectively at 750° C. analogously to Example 1, and the calcination products were wet-ground for 10 minutes at 1000 r.p.m. in a stirrer-equipped ball mill.

Chemical analysis of the end products showed 94.4±0.1% by weight of $Bi_2O_3$ and 5.5±0.1% by weight of $Cr_2O_3$, which corresponds to a mixed phase composition of $Bi_{1.7}Cr_{0.3}O_3$. The specific surfaces of the orange-colored products were 2.9 and 3.1 m²/g respectively.

EXAMPLE 3

88.82 g of finely powdered metallic bismuth (99.99%; <40 μm) and 8.88 g of Cr-(III)-hydroxide (64.2% of $Cr_2O_3$) were processed into a paste with 25 ml of water according to Example 1, and further processed.

The raw material mixture was calcined, ground and worked up as described in Example 2.

Chemical analysis of the end products showed 94.6±0.2% by weight of $Bi_2O_3$ and 5.5±0.3% by weight of $Cr_2O_3$, which corresponds to a mixed phase composition of $Bi_{1.7}Cr_{0.3}O_3$. The specific surfaces of the orange-colored products were 2.8 and 2.9 m²/g respectively.

EXAMPLE 4

266.48 g of finely powdered metallic bismuth (99.99%; <40 μm) and 17.27 g of $Cr_2O_3$ (99.0%) were mixed with about 25 ml of water over a period of 60 minutes in a mortar mill, dried at 105° C. and then crushed into a homogeneous powder. The raw material mixture was calcined according to Example 1 at 750° C. (16 hours). The calcination product was wet-ground for 5 minutes at 500 r.p.m. in a stirrer-equipped ball mill, filtered, washed and, after drying, an orange-red mixed phase pigment having the composition $Bi_{1.7}Cr_{0.3}O_3$ (94.5% by weight of $Bi_2O_3$; 5.3% by weight of $Cr_2O_3$) was obtained.

The specific surface was 1.0 m²/g.

EXAMPLE 5

266.48 g of finely powdered metallic bismuth (99.99%; <40 μm) and 22.73 g of $CrO_3$ (99.0%) were mixed with about 25 ml of water for 60 minutes in a mortar mill, dried at 105° C. and then crushed into a homogeneous powder.

The operations of calcining, grinding and working up were carried out according to Example 4.

The orange-red mixed phase pigment had the composition $Bi_{1.7}Cr_{0.3}O_3$ (94.6% by weight of $Bi_2O_3$; 5.5% of $Cr_2O_3$) and had a specific surface of 1.1 m²/g.

EXAMPLE 6

A homogeneous raw material mixture was prepared according to Example 4, and was calcined in a rotary tubular kiln for 16 hours at 750° C. without gassing with an air/oxygen mixture. The calcined product was ground (5 minutes at 500 r.p.m. in a stirrer-equipped ball mill), filtered, washed and dried at 105° C. in a drying chamber.

The orange-red mixed phase pigment had the composition $Bi_{1.7}Cr_{0.3}O_3$ (94.3% by weight of $Bi_2O_3$; 5.6% by weight of $Cr_2O_3$), and a specific surface of 1.1 m²/g.

EXAMPLE 7

The following raw materials were processed into a homogeneous mixture according to Example 4, and calcined for 16 hours at 750° C. in a rotary tubular kiln with air/oxygen gassing (20 l/h; 1:1):

a.
  198.55 g of finely powdered metallic bismuth (99.99%, <40 μm)
  3.84 g of $Cr_2O_3$ (99.0%), and about 20 ml of water b.
  167.20 of finely powdered metallic bismuth
  15.35 g of $Cr_2O_3$, and about 20 ml of water c.
  156.75 g of finely powdered metallic bismuth,
  19.19 g of $Cr_2O_3$, and about 20 ml of water.

at 500 r.p.m. in a stirrer-equipped ball mill, filtered, washed and dried at 105° C.

A characterization of the products is provided in the following Table 2.

TABLE 2

| Product | Analytical composition | Specific surface m²/g | Visual color assessment |
|---|---|---|---|
| a. $Bi_{1.9}Cr_{0.1}O_3$ | 97.6% $Bi_2O_3$; 2.3% $Cr_2O_3$ | 1.5 | orange |
| b. $Bi_{1.6}Cr_{0.4}O_3$ | 92.3% $Bi_2O_3$; 7.5% $Cr_2O_3$ | 1.3 | yellow-orange |
| c. $Bi_{1.5}Cr_{0.5}O_3$ | 90.0% $Bi_2O_3$; 9.7% $Cr_2O_3$ | 1.3 | yellow-orange |

EXAMPLE 8

888.25 g of finely powdered metallic bismuth (99.99%; <40 μm) and 57.57 g of $Cr_2O_3$ (99%) were mixed with about 125 ml of water for 1 hour in a mortar mill, and further processed according to Example 4.

The raw material mixture was calcined in a rotary tubular kiln at 750° C.) with air/oxygen gassing (20 l/h; 1:1; 16 hours). ⅓ each of the calcined product were wet-ground for 5 minutes at 500 r.p.m., for 10 minutes at 1000 r.p.m. and for 60 minutes at 1500 r.p.m. in a stirrer-equipped ball mill, then filtered, washed and dried at 105° C. Chemical analysis showed a mixed phase composition of $Bi_{1.7}Cr_{0.3}O_3$ (94.4% by weight of $Bi_2O_3$; 5.4% by weight of $Cr_2O_3$). The characterization after the wet grinding operation is provided in Table 3.

TABLE 3

| Grinding | Specific surface $m^2/g$ | Visual color assessment |
|---|---|---|
| 5 min at 500 rpm | 1.3 | orange-red |
| 10 min at 1000 rpm | 3.2 | orange |
| 60 min at 1500 rpm | 6.5 | yellow-orange |

EXAMPLE 9

A raw material mixture was prepared according to Example 8, and ⅓ each of this mixture were calcined for 8 hours in a rotary tubular kiln at 550°, 650° and 750° C. respectively with air/oxygen gassing (20 l/h; 1:1).

The calcined products were ground for 10 minutes at 1000 r.p.m. in a stirrer-equipped ball mill, filtered, washed and dried at 105° C. Base on chemical analysis, the mixed phase pigments had the composition $Bi_{1.7}Cr_{0.3}O_3$ (94.5±0.2% by weight of $Bi_2O_3$; 5.4±0.2% by weight of $Cr_2O_3$). The characterization of the products is provided in Table 4.

TABLE 4

| Calcination Grinding | Specific surface $m^2/g$ | Visual color assessment |
|---|---|---|
| 8 h at 550° C. 5 min at 1000 rpm | 5.6 | yellow-orange |
| 8 h at 650° C. 5 min at 1000 rpm | 4.2 | yellow-orange |
| 8 h at 750° C. 5 min at 1000 rpm | 2.6 | orange |

It will be appreciated that the instant specification and examples are set forth by way of illustration and not limitation, and that various modifications and changes may be made without departing from the spirit and scope of the present invention.

We claim:

1. A process for the production of bismuth oxide/chromium oxide mixed phase pigments ranging in color from yellow-orange to orange-red, comprising mixing metallic bismuth intensively with at least one of a chromium (III) and a chromium (VI) compound, calcining the homogeneous mixture in an oxidizing atmosphere at a temperature of about 500° to 800° C., and crushing the product to pigment size.

2. A process according to claim 1, wherein the metallic bismuth is present as finely-divided powder.

3. A process according to claim 1 wherein the chromium compound comprises at least one of chromium (III) oxide, chromium (III)hydroxide, chromium (VI) oxide, chromium (III) acetate and chromium oxide hydrate.

4. A process according to claim 1, wherein the bismuth metal powder and the chromium component are mixed dry.

5. A process according to claim 1, wherein the bismuth metal powder and the chromium component are mixed wet.

6. A process according to claim 1, wherein the reaction of the raw material mixture takes place preferably with circulation in one calcination step.

7. A process according to claim 1, wherein the reaction takes place in the presence of air.

8. A process according to claim 1, wherein the calcination temperature is from about 650° to 750° C.

9. A process according to claim 2, wherein the metallic bismuth is present as finely divided powder, and the calcination takes place at about 650° to 750° C. in one step in the presence of air and with circulation.

* * * * *